(12) United States Patent
Hager et al.

(10) Patent No.: US 10,294,926 B2
(45) Date of Patent: May 21, 2019

(54) WIND POWER PLANT GEAR MECHANISM

(71) Applicant: Miba Gleitlager Austria GmbH, Laakirchen (AT)

(72) Inventors: Gunther Hager, Micheldorf (AT); Johannes Sebastian Hoelzl, Berg im Attergau (AT)

(73) Assignee: Miba Gleitlager Austria GmbH, Laakirchen (AT)

( * ) Notice: Subject to any disclaimer, the term of this patent is extended or adjusted under 35 U.S.C. 154(b) by 215 days.

(21) Appl. No.: 14/762,541

(22) PCT Filed: Jan. 27, 2014

(86) PCT No.: PCT/AT2014/050030
§ 371 (c)(1),
(2) Date: Jul. 22, 2015

(87) PCT Pub. No.: WO2014/117197
PCT Pub. Date: Aug. 7, 2014

(65) Prior Publication Data
US 2015/0369352 A1  Dec. 24, 2015

(30) Foreign Application Priority Data

Jan. 30, 2013  (AT) .................. 50067/2013

(51) Int. Cl.
*F03D 80/70* (2016.01)
*F16C 17/10* (2006.01)
(Continued)

(52) U.S. Cl.
CPC ............. *F03D 80/70* (2016.05); *F03D 15/00* (2016.05); *F16C 17/04* (2013.01); *F16C 17/105* (2013.01);
(Continued)

(58) Field of Classification Search
CPC .......... F16C 17/02; F16C 17/04; F16C 17/10; F16C 17/105; F16C 33/04; F16C 33/1055;
(Continued)

(56) References Cited

U.S. PATENT DOCUMENTS 2,318,114 A    5/1943  Tichvinsky
3,112,116 A *  11/1963 Seitz ................... B23B 31/4073
                                                        269/52
(Continued)

FOREIGN PATENT DOCUMENTS

AT       509 624 A1    10/2011
CN       101956676 A    1/2011
(Continued)

OTHER PUBLICATIONS

International Search Report of PCT/AT2014/050028, dated Jun. 3, 2014.
(Continued)

*Primary Examiner* — Victor L Macarthur
*Assistant Examiner* — Joseph Brown
(74) *Attorney, Agent, or Firm* — Collard & Roe, P.C

(57) ABSTRACT

The invention relates to a wind power plant gear mechanism (1) with an axle (5) and a gearwheel (2), wherein at least one plain bearing bush (4, 20) is arranged between the axle (5) and the gearwheel (2), and wherein the at least one plain bearing bush (4, 20) is connected to the gearwheel (2) via a conical press fit, wherein the at least one plain bearing bush (4, 20) has a first end surface (8) and a second end surface (9) which lies opposite the former along a longitudinal center axis (7) through the at least one plain bearing bush (4, 20), and wherein the first end surface (8) has a diameter d (10) and the second end surface (9) has a diameter D (11), wherein the diameter D (11) is greater than the diameter d (Continued)

(10), and wherein a bearing surface (13) for the at least one plain bearing bush (4, 20) is formed so as to adjoin the end surface (9) with the diameter D (11).

14 Claims, 3 Drawing Sheets

(51) Int. Cl.
| | |
|---|---|
| *F16C 17/04* | (2006.01) |
| *F16C 33/10* | (2006.01) |
| *F16C 33/12* | (2006.01) |
| *F16H 55/17* | (2006.01) |
| *F03D 15/00* | (2016.01) |
| *F16H 57/08* | (2006.01) |
| *F16D 1/08* | (2006.01) |

(52) U.S. Cl.
CPC ........ *F16C 33/1055* (2013.01); *F16C 33/122* (2013.01); *F16H 55/17* (2013.01); *F05B 2260/40311* (2013.01); *F16C 2360/31* (2013.01); *F16C 2361/61* (2013.01); *F16D 1/0858* (2013.01); *F16H 2057/085* (2013.01); *Y02E 10/722* (2013.01); *Y10T 74/1986* (2015.01)

(58) Field of Classification Search
CPC .. F16C 33/122; F16C 2360/31; F16C 1/0852; F16C 1/0858; F16D 1/0852; F16D 1/0858; F16D 1/09; F16H 55/12; F16H 55/17; F16H 2057/085; Y02E 10/722; F03D 15/00; F03D 80/70; F05B 2260/40311; F03C 15/00; F03C 80/70
See application file for complete search history.

(56) References Cited

U.S. PATENT DOCUMENTS

| | | | |
|---|---|---|---|
| 3,539,035 A | 11/1970 | Wolkenstein | |
| 3,736,705 A | 6/1973 | Ryan et al. | |
| 3,821,908 A | 7/1974 | Marsch et al. | |
| 3,822,607 A | 7/1974 | Tharaldsen | |
| 3,837,068 A * | 9/1974 | Dunn | B22F 7/062 29/505 |
| 4,083,612 A | 4/1978 | Olson | |
| 4,271,928 A | 6/1981 | Northern | |
| 4,771,654 A * | 9/1988 | Shinjo | F16H 1/2836 475/31 |
| 4,878,820 A | 11/1989 | Doi et al. | |
| 4,939,827 A | 7/1990 | Iizuka | |
| 5,102,379 A | 4/1992 | Pagluica et al. | |
| 5,529,399 A | 6/1996 | Holze | |
| 5,743,658 A | 4/1998 | Vollmer et al. | |
| 5,947,608 A * | 9/1999 | Kim | F16C 17/105 384/110 |
| 6,471,404 B1 | 10/2002 | Gozdawa | |
| 6,602,158 B2 | 8/2003 | Wildeshaus | |
| 6,663,289 B1 * | 12/2003 | Iljin | F16C 17/04 384/129 |
| 6,695,480 B1 * | 2/2004 | Ramsay | F04D 29/047 384/110 |
| 6,929,402 B1 | 8/2005 | Titus | |
| 7,090,401 B2 * | 8/2006 | Rahman | F16C 17/02 384/108 |
| 7,390,125 B2 * | 6/2008 | Kennedy | B23C 3/02 384/110 |
| 7,540,664 B2 * | 6/2009 | Rahman | F16C 17/02 384/100 |
| 7,967,712 B2 | 6/2011 | Nakamura et al. | |
| 8,272,990 B2 | 9/2012 | Hagedorn et al. | |
| 8,298,108 B2 | 10/2012 | Nishida et al. | |
| 8,500,333 B2 * | 8/2013 | Osgood | F16C 23/046 384/192 |
| 8,578,806 B2 | 11/2013 | Leimann et al. | |
| 8,591,371 B2 * | 11/2013 | Dinter | F03D 15/00 475/160 |
| 8,840,521 B2 | 9/2014 | Kari et al. | |
| 9,011,010 B2 * | 4/2015 | Mueller | F03D 7/0224 384/221 |
| 2008/0268997 A1 | 10/2008 | Gooden | |
| 2009/0247348 A1 | 10/2009 | Haupt et al. | |
| 2011/0140448 A1 * | 6/2011 | Takeuchi | F16H 57/082 290/55 |
| 2011/0176907 A1 | 7/2011 | Groves et al. | |
| 2011/0223009 A1 | 9/2011 | Grann et al. | |
| 2011/0235210 A1 | 9/2011 | Himeno et al. | |
| 2012/0051915 A1 * | 3/2012 | suzuki | F16H 57/082 416/170 R |
| 2012/0108380 A1 | 5/2012 | Dinter et al. | |
| 2012/0224799 A1 | 9/2012 | Wagner | |

FOREIGN PATENT DOCUMENTS

| | | | |
|---|---|---|---|
| CN | 201802752 U | 4/2011 | |
| CN | 102223006 A | 10/2011 | |
| CN | 102472256 A | 5/2012 | |
| DE | 19 85 822 U | 5/1968 | |
| DE | 1 425 132 A1 | 12/1968 | |
| DE | 1 650 681 A1 | 11/1970 | |
| DE | 22 29 235 A1 | 1/1973 | |
| DE | 2 357 399 A1 | 5/1974 | |
| DE | 33 18 967 A1 | 2/1984 | |
| DE | 38 17 312 A1 | 12/1988 | |
| DE | 43 36 915 A1 | 5/1995 | |
| DE | 195 46 974 A1 | 6/1997 | |
| DE | 199 60 157 A1 | 6/2001 | |
| DE | 11 2007 000 884 B4 | 2/2009 | |
| DE | 20 2010 000914 U1 | 4/2010 | |
| DE | 10 2010 000 809 A1 | 1/2011 | |
| EP | 1 353 082 A1 | 10/2003 | |
| EP | 2 063 139 A1 | 5/2009 | |
| EP | 2 221 510 A1 | 8/2010 | |
| EP | 2 284 420 B1 | 2/2011 | |
| EP | 2 383 480 A1 | 11/2011 | |
| EP | 2 489 902 A1 | 8/2012 | |
| EP | 2 662 598 A1 | 11/2013 | |
| FR | 1 110 347 A | 2/1956 | |
| GB | 712 079 A | 7/1954 | |
| JP | S48 27143 A | 8/1973 | |
| JP | S48 96382 U | 12/1973 | |
| JP | S58 49017 U | 4/1983 | |
| JP | 58166122 A * | 10/1983 | ............ F16C 25/04 |
| JP | S58166122 A | 10/1983 | |
| JP | S61 75520 U | 5/1986 | |
| JP | S61 241522 A | 10/1986 | |
| JP | S62 151426 A | 7/1987 | |
| JP | 2000-320649 A | 11/2000 | |
| JP | WO 2012029129 A1 * | 3/2012 | ......... F16H 57/0479 |
| WO | 2011/127509 A1 | 10/2011 | |

OTHER PUBLICATIONS

International Search Report of PCT/AT2014/050029, dated Jul. 17, 2014.
International Search Report of PCT/AT2014/050030, dated Jul. 8, 2014.

* cited by examiner

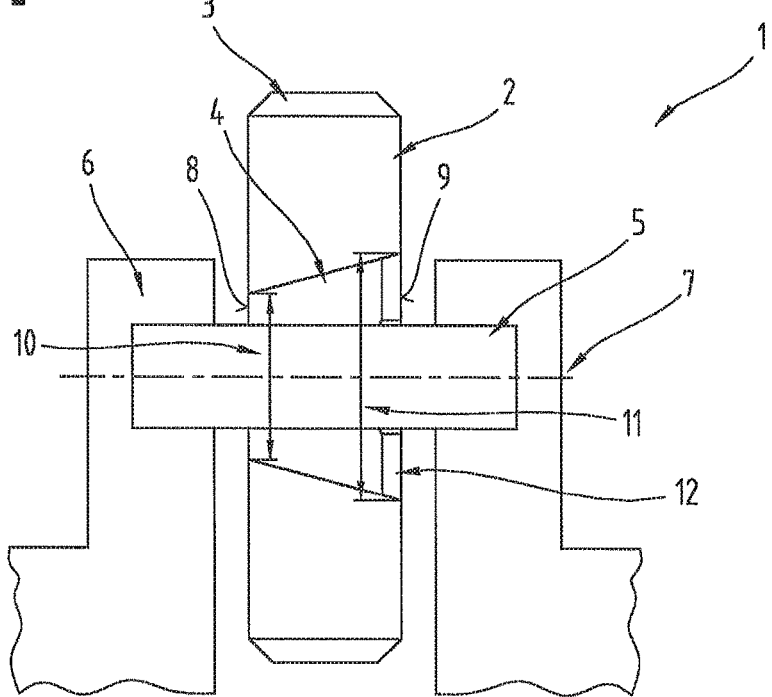
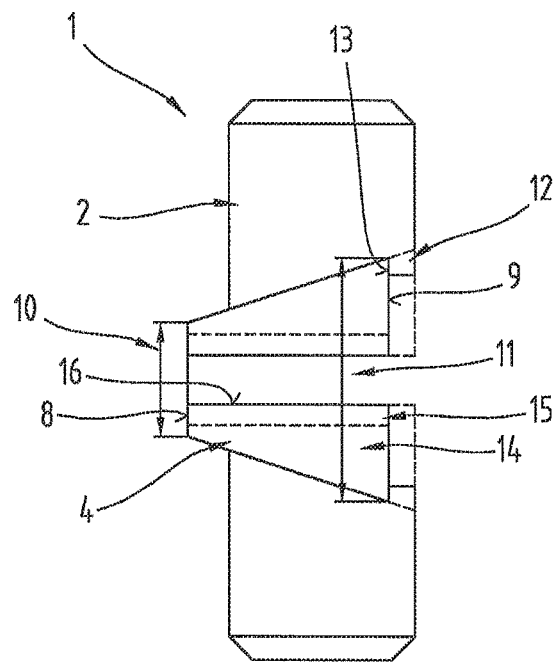
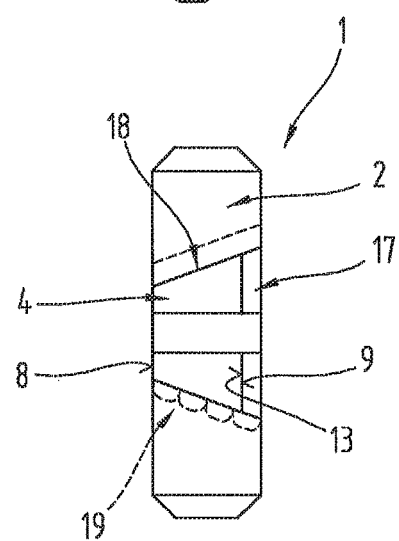

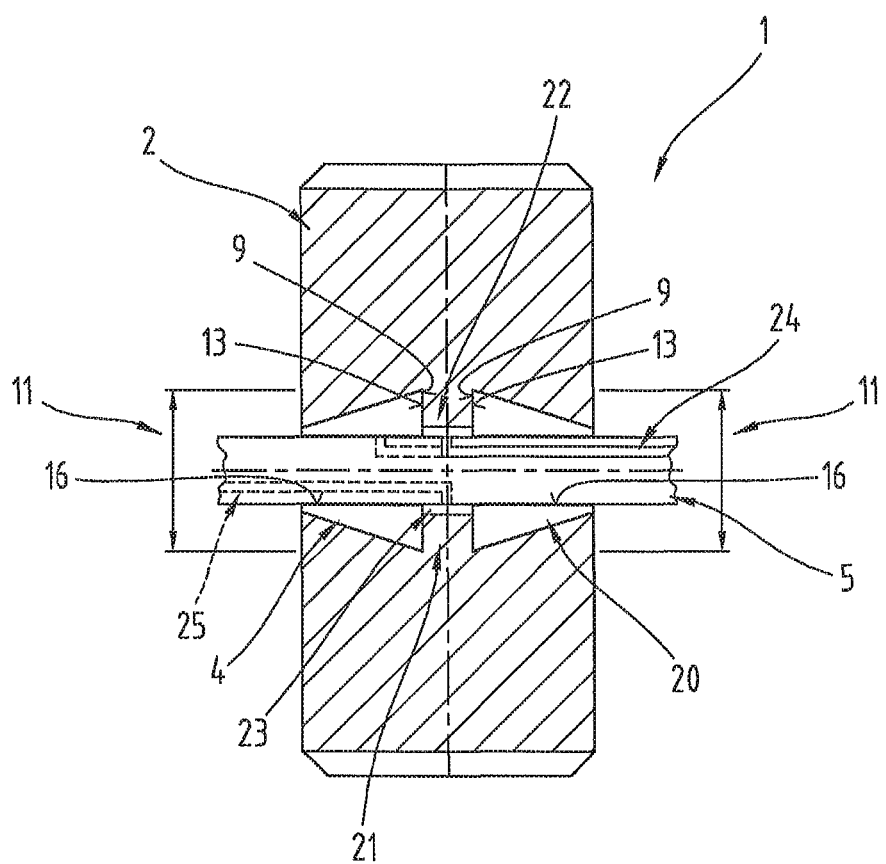

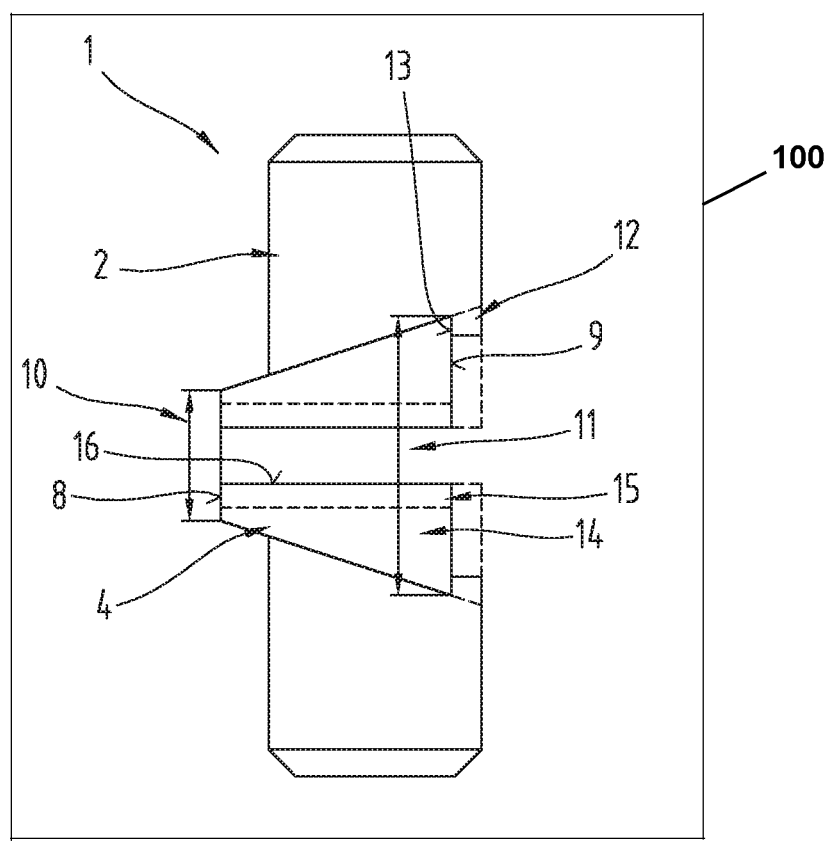

WIND POWER PLANT GEAR MECHANISM

CROSS REFERENCE TO RELATED APPLICATIONS

This application is the National Stage of PCT/AT2014/050030 filed on Jan. 27, 2014, which claims priority under 35 U.S.C. § 119 of Austrian Application No. A 50067/2013 filed on Jan. 30, 2013, the disclosure of which is incorporated by reference. The international application under PCT article 21(2) was not published in English.

The invention relates to a wind power plant gear mechanism with an axle and a gearwheel, wherein at least one plain bearing bush is arranged between the axle and the gearwheel, as well as a wind power plant comprising a wind power plant gear mechanism.

Roller bearings are currently the only commercial solution for supporting planetary gearwheels in planetary gear systems for wind power plants. In said bearings there is often a problem in that because of rotational, cyclical loads the outer rings rotate and due to additional axial forces the roller bearings also axially depart from their intended position and migrate. To manage this problem bearing solutions have been proposed without outer rings.

Plain bearing solutions for planetary gear systems of wind power plants have also already been described, but have not yet been exploited commercially. However, the probability that plain bearings will also migrate because of the acting loads is very high.

The underlying objective of the present invention is therefore to create a plain bearing for wind power plant gear mechanisms in which the migration of the plain bearing is prevented.

To achieve this objective in a wind power plant gear mechanism the at least one plain bearing bush is connected by a conical press fit to the gearwheel, wherein the plain bearing bush comprises a first end surface and a second end surface which lies opposite the former along a longitudinal center axis through the plain bearing bush, and wherein the first end surface has a diameter d and the second end surface has a diameter D, wherein the diameter D is greater than the diameter d and wherein a bearing surface for the at least one plain bearing bush is formed adjoining the end surface with the diameter D, and in the aforementioned wind power plant a correspondingly designed wind power plant gear mechanism is used.

It is an advantage that the permanent fixing of the plain bearing bush in position can be improved significantly by means of simple structural means. No additional means are required such as for example adhering or welding the plain bearing bush to the gearwheel. Furthermore, by means of the conical press-fit a better centering of the gearwheel is achieved, whereby the gearwheel can run more smoothly. With this embodiment of the plain bearing bush it is possible, even in the most unfavorable case where the plain bearing bush begins to rotate because of cyclical loads and resulting deformations, that the plain bearing bush is returned by means of forces acting in axial direction. In this way axial migration can be prevented more effectively. By means of the bearing surface for the plain bearing bush axial forces resulting from the conical bearing fit are supported, thereby supporting prevention of the migration of the plain bearing bush.

Preferably, the ratio of the large diameter to small diameter of the plain bearing bush (D/d) is a maximum of 1.2, wherein according to a further embodiment variant said ratio D/d is preferably selected from a range of 1.0001 to 1.02, in order thus to limit the axial force acting on the bearing surface.

The bearing surface is preferably formed by the gearwheel itself, as in this way the assembly of said assembly group can be simplified. In addition, it is possible for the bearing surface to be formed by a radial projection of the gearwheel, as this can be manufactured easily.

According to a further embodiment variant two plain bearing bushes can be arranged between the gearwheel and the axle for supporting the gearwheel, wherein the two plain bearing bushes are arranged such that the two second end surfaces with the larger diameter D point towards one another. In this way the aforementioned effects are improved further, as by means of the two plain bearing bushes installed opposite on another the axial migration of the plain bearing bushes can be prevented more effectively.

The bearing surfaces for the plain bearing bushes can be formed in this embodiment variant by an annular web, which is formed extending on the gearwheel radially inwardly in the direction of the axle. Preferably, said annular web is arranged on the gearwheel in the center as viewed in axial direction. The annular web also has the additional advantage that by means of the latter a lubricant can be supplied to the bearing points if necessary.

It is also possible that the bearing surface is formed for a respective plain bearing by the respective other plain bearing, so that in this regard no further measures need to be performed on the gearwheel.

The plain bearing bush or bushes can be configured as multi-layered plain bearings. In addition to the known effect that in this way the tribological properties of the plain bearing can be adapted specifically to the respective requirements, it is mainly achieved in this way that by means of a suitable material pairing higher frictional forces can be provided by the gearwheel, whereby the holding force of the press fit can be increased.

It is possible that the multi-layered plain bearing comprises a sliding layer in the region of the axle as already known, wherein according to a further embodiment variant the sliding layer has a uniform thickness over the length of the plain bearing bush in axial direction.

The sliding layer can be formed up to the area of the end surface with the diameter D and/or up to the area of the end surface with the diameter d. In this way if there is a rotation of the plain bearing bush or bushes even in radial direction a corresponding sliding surface is provided, i.e. an axial bearing, whereby in this case the plain bearing bush or bushes can be protected from damage more effectively.

In support of the press-fit the plain bearing bush or plain bearing bushes can also be connected in a form-fitting manner to the gearwheel, whereby the permanent fixing of the plain bearing bush or bushes in position can be improved further.

However, it is also possible for a surface of the plain bearing bush or bushes bearing on the gearwheel to have a roughened surface. By means of the surface roughness the holding force of the press-fit can be increased further, whereby the permanent fixing in position of the plain bearing bush can also be improved further.

In the embodiment variant of the gearwheel with the aforementioned annular web the latter can be designed to be spaced apart from the axle with the formation of an intermediate space. In this way a simple way of supplying lubricant can be created.

It is also possible for a connecting line to open into the intermediate space and connect the intermediate space with the surrounding atmosphere, whereby with respect to the distribution of lubricant the restricting effect of the bearing points can be reduced.

For a better understanding of the invention the latter is explained in more detail with reference to the following Figures.

In a much simplified representation:

FIG. 1 shows a cross-section of a wind power plant gear mechanism in side view;

FIG. 2 shows a cross-section of an embodiment variant of the wind power plant gear mechanism in side view;

FIG. 3 shows a cross-section of a further embodiment variant of the wind power plant gear mechanism in side view;

FIG. 4 shows a cross-section of another embodiment variant of the wind power plant gear mechanism in side view; and FIG. 5 shows a wind power plant.

First of all, it should be noted that in the variously described exemplary embodiments the same parts have been given the same reference numerals and the same component names, whereby the disclosures contained throughout the entire description can be applied to the same parts with the same reference numerals and same component names. Also details relating to position used in the description, such as e.g. top, bottom, side etc. relate to the currently described and represented figure and in case of a change in position should be adjusted to the new position.

It is known and shown in FIG. 5 that wind power plants 100 comprise a tower 101 with a gondola 102 arranged at its upper end, in which gondola 102 the rotor 103 is mounted with the rotor blades 104. Said rotor 103 is operatively connected via a wind power plant gear mechanism 1 to the generator 105 which is also located in the gondola 102, wherein by means of the wind power plant gear mechanism 1 the low speed of the rotor 103 is translated into a higher speed of the rotor of the generator 105. As such embodiments of wind power plants 100 form part of the prior art, reference is made here to the relevant literature.

FIG. 1 shows a section of a first embodiment variant of a wind power plant gear mechanism 1 according to the invention. The latter comprises at least one gearwheel 2. Said gearwheel 2 is arranged in the wind power plant gear mechanism 1 in meshing engagement between a second and a third gearwheel (both not shown). In addition, the at least one gearwheel 2 comprises an outer spur gearing 3.

In the embodiment of the wind power plant gear mechanism 1 designed as a planetary gear, in particular as a main gear of a wind power plant, the second gearwheel is configured as a sun gear with a spur gearing which is connected in a rotationally secure manner to a shaft. The sun gear is usually surrounded by a plurality of gear wheels 2, planetary gears, for example two, preferably three or four.

The third gearwheel is configured as a hollow gear which surrounds the at least one gearwheel 2 or the gearwheels 2 in radial direction and which on an inner surface also comprises at least partly a toothing, which is meshing engagement with the outer spur gearing 3 of the gearwheel 2 or the gearwheels 2. The hollow gear is connected in a rotationally secure manner to a rotor shaft of the rotor of the wind power plant or in a rotationally secure manner to the housing of the wind power plant gear mechanism 1.

The toothings of the gearwheels 2 in the wind power plant gear mechanism 1 can be designed as straight spurs or in particular as oblique spurs.

The at least one gearwheel 2 (in the following only one gearwheel 2 is described, wherein said embodiments can also be applied to all or several of said gearwheels 2 of the wind power plant gear mechanism 1) is mounted by a plain bearing in the form of a plain bearing bush 4, in particular a multi-layered plain bearing, on an axle 5, for example a planet shaft (the so-called planet axle). Said axle 5 can either be designed in one piece with at least part of a gearwheel support 6, in particular a planet support, or it is inserted as a separate component in a bore of the gearwheel support 6.

It should be noted that not only single stage embodiments of such wind power plant gear mechanisms 1 are possible within the scope of the invention, but also multi-stage, for example two or three-stage embodiments are possible, wherein additional spur gear stages can be integrated into at least one gearwheel 2, in particular a planetary gear. In addition, parallel gears are also possible within the scope of the invention, as described for example in EP 2 284 420 B1. Therefore, reference is made to this document which in this regard is associated with the present description. Accordingly, the wind power plant gear mechanism 1 can comprise a single planetary gear unit and a parallel two or multi-stage planetary gear unit or generally a plurality of planetary gear units.

Furthermore, it should also be noted that, although preferred, the invention is used not only in the planetary gear units of wind power plants, but can be used generally in gear mechanisms for wind power plants, in particular for translating the slow speed of the rotor of a wind power plant into a higher speed.

The plain bearing bush 4 is connected in a rotationally secure manner by press-fit to the gearwheel 2. The press-fit is designed to be conical. In addition, the plain bearing bush 4 is designed to be in the form of a truncated cone and has opposite end surfaces 8, 9 along a longitudinal middle axis 7. The first end surface 8 has an outer diameter d 10 and the second end surface 9 has an outer diameter D 11, wherein the first diameter d 10 is smaller than the second diameter D 11.

The absolute size of the diameter d 10 and D 11 corresponds to the respective gear size. Preferably, the ratio D/d is a maximum of 1.2, in particular a maximum of 1.1. In particular, the ratio D/d is selected from a range of 1.0001 to 1.02, preferably from a range of 1.0001 to 1.008.

In particular, the diametric cone widening is between 0.01% and 0.6%, for example 0.1%, of the outer diameter D 11.

The plain bearing bush 4 can be designed to be in a single layer and in this case consists of a sliding material, i.e. a material which has reduced friction in relation to the material of the axle 5. In addition, said sliding material can be selected from the following materials for a sliding layer.

The plain bearing bush 4 according to the invention can be produced to already have a corresponding shape, for example from a corresponding blank sheet. It is also possible however to form the latter by widening with a corresponding tool from a cylindrical plain bearing. For example, said widening can be performed at the same time as pressing the plain bearing bush 4 into the gearwheel 2 to form the press-fit.

FIGS. 2, 3 and 4 shows sections of additional and possibly independent embodiments of the of the wind power plant gear mechanism 1, wherein the same reference numerals and components names have been used for the same parts as in the preceding FIG. 1. To avoid unnecessary repetition reference is made to the detailed description of FIG. 1.

In the embodiment variant of the wind power plant gear mechanism 1 according to FIG. 2 the gearwheel 2 comprises a radial projection 12 in the region of the second (large) diameter D 11 of the end surface 9 of the plain bearing bush 4 which is preferably in the form of a circular ring. The radial projection 12 is used as an axial securing means of the plain bearing bush 4, so that the latter bears with the end surface 9 against the radial projection 12 at least for a time, the latter thus forms a bearing surface 13 for the plain bearing bush 4 in axial direction. In addition, the radial projection 12 projects radially inwards so that there is an overlap—as viewed in axial direction—with the plain bearing bush.

The radial projection 12 can extend continuously over the whole circumference of the plain bearing bush 4. However, it is also possible that only a single radial projection 12 or a plurality of radial projections 12 are arranged distributed over the inner circumference of the gearwheel 2 which extend only over a portion of the 360° of the circumference.

It is also possible that the radial projection 12 extends up to the axle 5 and is spaced apart from the latter.

The radial projection 12 is preferably formed in one piece with the gearwheel 2. However, it is also possible for the latter to be formed by a separate component that is connected to the gearwheel 2.

According to one embodiment variant the radial projection 12 can be arranged on the axle 5 instead of the gearwheel 2 (cf. FIG. 1), for example as an annular web.

Said radial projection 12 for absorbing axial forces is also provided in the embodiment variant according to FIG. 1.

FIG. 2 also shows that as viewed in radial direction the plain bearing bush 4 need not necessarily be arranged flush with the gearwheel 2, as shown in FIG. 1, but can also be arranged to be offset in axial direction, whereby in this case the plain bearing bush 4 preferably projects in the region of the first diameter d 10 in axial direction over the gearwheel 2.

FIG. 2 also shows the embodiment variant of the plain bearing bush 4 as a multi-layered plain bearing by a dashed line.

The multi-layered plain bearing consists of at least one support layer 14, which is made of steel for example, and a sliding layer 15, which is applied radially inwardly on the support layer 14. The sliding layer 15 thereby forms a running surface 16 for the axle 5 (cf. FIG. 1).

In addition to this two-layered embodiment of the multi-layered plain bearing it is also possible within the scope of the invention that intermediate layers are arranged between the sliding layer 15 and the support layer 14, for example a bearing metal layer and/or at least one bonding layer and/or a diffusion barrier layer.

Examples of materials for the individual layers of the multi-layered plain bearing are known from AT 509 624 B1 which is referred to in this document and which is thus associated with the description of the present invention.

However, single-layered embodiment variants of the plain bearing bush 4 are also possible. The latter can consist for example of a copper alloy, in particular bronze or brass.

The sliding layer 15 or all of the layers of the multi-layered plain bearing bush can also have a truncated-cone-shape. It is also possible, as shown in FIG. 2, that the sliding layer 15 has a uniform layer thickness over the length of the plain bearing bush 4 in axial direction.

According to a further embodiment variant of the plain bearing bush 4 the sliding layer 15 is formed up to the area of the end surface with diameter D, as shown by a dashed line in FIG. 2. The sliding layer 15 thus not only has a first extension in longitudinal direction of the plain bearing bush 4 but also in radial direction. In principle, the sliding layer 15 can be applied separately to the end surface 9 of the plain bearing bush 4.

Of course, it is also possible for such a sliding layer to also be applied to the end surface 8 of the plain bearing bush 4 so that the support layer 14 is thus coated at least partly on both sides of the end surfaces 8, 9.

In an axial arrangement next to the end surface 8 and/or the end surface 9 of the plain bearing bush 4 also a run-on disc can be provided between the plain bearing bush 4 and the gearwheel support 6 (cf. FIG. 1). In this case the sliding layer 15 of the plain bearing bush 4 can be pulled up into the end surface to the run-on discs.

The plain bearing bush 4 can also perform an axial bearing function in addition to the radial bearing function.

In the embodiment variant of the wind power plant gear mechanism 1 according to FIG. 3 instead of the radial projection 12 according to FIG. 2 an, in particular disc-like, component 17 is provided, which can be connected either to the gearwheel 2 or to the axle 5 (cf. FIG. 1) and forms the bearing surface 13 for the plain bearing bush 4.

Furthermore, FIG. 3 shows by dashed lines that the plain bearing bush 4 can be connected to the gearwheel 2 in addition or alternatively by at least one form fitting element 18. Said form fitting element 18 can for example be a longitudinal web arranged on the outer surface of the plain bearing bush 4, which faces the gearwheel 2, which longitudinal web is pushed into a corresponding longitudinal groove of the gearwheel 2. The longitudinal web can thereby extend over at least a portion of the length or over the whole length between the two end surfaces 8, 9 of the plain bearing bush 4.

In addition, more than one longitudinal web can be arranged on the outer surface of the plain bearing bush 4, for example two, three, four, etc., wherein the latter in this case are preferably arranged distributed symmetrically over the circumference of the plain bearing bush 4.

The form fitting element 18 can also have different appropriate shape however.

In the lower part of the plain bearing bush 4 in FIG. 3 an embodiment variant of the formfitting of the plain bearing bush 4 with the bore in the gearwheel 2 mounting the plain bearing bush 4 is shown by dashed lines, the representation not being in proportion to provide a clearer view. In this embodiment variant, which can be provided alternatively or in addition to the form fitting element 18, a surface 19 of the plain bearing bush 4 bearing against the gearwheel 2, i.e. its casing surface, has a roughened surface, at least in some sections, in particular over the whole surface. The surface can be roughened by means of the suitable abrasive removal of material, for example sand blasting or erosion. In particular, the surface 19 can have an arithmetic average roughness value Ra according to DIN EN ISO 4287, which is selected from a range with a lower limit of 1 μm and an upper limit von 20 μm, in particular selected from a range with a lower limit von 4 μm and an upper limit of 10 μm. Furthermore, said surface 19 can have a maximum roughness profile Rz according to DIN EN ISO 4287, which is selected from a range with a lower limit of 2 μm and an upper limit of 100 μm, in particular selected from a range with a lower limit of 20 μm and an upper limit of 70 μm.

FIG. 4 shows a cross section of a further embodiment variant of the wind power plant gear mechanism 1 in side view. The gearwheel 2 is shown which is mounted on the axle 5 by two plain bearing bushes 4, 20, whereby the plain bearing bushes are arranged between the axle 5 and the gearwheel 2.

The plain bearing bushes 4, 20 in turn have a conical shape and are arranged in conical mounts in the gearwheel 2, whereby the conical press fit is formed. In this case the arrangement is such that the end surfaces 9 with the respectively larger diameter 11 of the two plain bearing bushes 4, 20 point towards one another. In other words, the plain bearing bushes 4, 20 in the gearwheel 2 are arranged with a cross section tapering outwardly in axial direction. In this way the two plain bearing bushes 4, 20 are arranged opposite one another in the gearwheel 2.

An intermediate space 21 is formed between the two plain bearing bushes 4, 20 into which an annular web 22 of the gear wheel 2 projects. The annular web 22 forms the bearing surfaces 13 for the end surfaces 9 of the two plain bearing bushes 4, 20.

According to a preferred embodiment variant the annular web 22 does not extend in radial direction up to the axle 5, so that the latter is arranged spaced apart from the surface of the axle 5 forming an intermediate space 23. Said intermediate space 23 can be used for supplying a lubricant, in particular a lubricant oil, whereby a feed line 24 for the lubricant opens into said intermediate space 23. Preferably, the feed line 24 is guided through the axle 5 but can also be guided through the gearwheel 2.

Alternatively or in addition, it is possible for the lubricant to be supplied directly to the running surfaces 16, as represented by dashed lines in FIG. 4.

The intermediate space 23 can however also be connected by a connecting line 25 to the surrounding atmosphere. Preferably, the connecting line 25 is guided by the axle 5 (as shown by dashed lines in FIG. 4), however it can also be guided by the gearwheel 2. In this way the restricting effect of the bearing points can be reduced.

According to a particular embodiment variant of the wind power plant gear mechanism 1 according to FIG. 4 it is possible to omit the annular web 22 and the two plain bearing bushes 4, 20 can be arranged so that they lie against one another at their end surfaces 9. Thus each of the two respective plain bearing bushes 4, 20 forms the bearing surface 13 for the other plain bearing bush 4, 20.

With regard to further possible embodiments of the wind power plant gear mechanism 1 of this embodiment variant, particularly with regard to the plain bearing bushes 4, 20, reference is made to the above explanations.

Cylindrical plain bearing bushes 4, 20 can be used to form the conical press-fit in all of the embodiment variants of the invention. The latter are inserted into the corresponding mounts in the gearwheel 2 and then widened into a conical shape by a suitable tool.

As shown in FIG. 5, a wind power plant 100 includes a wind power plant planetary gear system as described herein. In this example, the wind power plant 100 includes the embodiment of a wind power plant gear mechanism 1 that is shown in FIG. 2.

Finally, as a point of formality, it should be noted that for a better understanding of the structure of the wind power plant gear mechanism 1 the latter and its components have not been represented true to scale in part and/or have been enlarged and/or reduced in size.

LIST OF REFERENCE NUMERALS 1 wind power plant gear mechanism
2 gearwheel
3 outer spur gearing
4 plain bearing bush
5 axle
6 gearwheel support
7 longitudinal center axis
8 end surface
9 end surface
10 diameter
11 diameter
12 radial projection
13 bearing surface
14 support layer
15 sliding layer
16 running surface
17 component
18 formfitting element
19 surface
20 plain bearing bush
21 intermediate space
22 annular web
23 intermediate space
24 feed line
25 connecting line
100 wind power plant

The invention claimed is:

1. A wind power plant planetary gear system with an axle and a gearwheel, at least one plain bearing bush being arranged between the axle and the gearwheel,
wherein the gearwheel comprises a bearing receiving portion having a conical shape,
wherein the at least one plain bearing bush has a conical shape and is connected to the bearing receiving portion of the gearwheel by a conical press fit,
wherein the at least one plain bearing bush is permanently fixed in position,
wherein the at least one plain bearing bush has a first end surface and a second end surface which lies opposite the former along a longitudinal center axis through the at least one plain bearing bush,
wherein the first end surface has a diameter d and the second end surface has a diameter D, the diameter D being greater than the diameter d,
wherein the gearwheel comprises a radial projection comprising a bearing surface, the bearing surface bearing against the second end surface,
wherein the radial projection is formed in one piece with the gearwheel, and
wherein the at least one plain bearing bush comprises a sliding layer in a region of the axle.

2. The wind power plant planetary gear system as claimed in claim 1, wherein a ratio of D/d is a maximum of 1.2.

3. The wind power plant planetary gear system as claimed in claim 2, wherein the ratio D/d is selected from a range of 1.0001 to 1.02.

4. The wind power plant planetary gear system as claimed in claim 1, wherein two plain bearing bushes are arranged between the gearwheel and the axle for supporting the gearwheel,
wherein the two plain bearing bushes are arranged such that the two second end surfaces with the larger diameter D point towards one another.

5. The wind power plant planetary gear system as claimed in claim 4, wherein the radial projection is formed by an annular web.

6. The wind power plant planetary gear system as claimed in claim 5, wherein the annular web is designed to be spaced apart from the axle forming an intermediate space.

7. The wind power plant planetary gear system as claimed in claim 6, wherein a connecting line opens into the intermediate space which connects the intermediate space to the surrounding atmosphere.

8. The wind power plant planetary gear system as claimed in claim 1, wherein the at least one plain bearing bush is configured as a multi-layered plain bearing.

9. The wind power plant planetary gear system as claimed in claim 1, wherein the sliding layer has a uniform layer thickness in an axial direction over a length of the plain bearing bush.

10. The wind power plant planetary gear system as claimed in claim 1, wherein the sliding layer is formed up to an area of at least one of the second end surface and the first end surface.

11. The wind power plant planetary gear system as claimed in claim 1, wherein the at least one plain bearing bush is additionally connected to the gearwheel in a form-fitting manner.

12. The wind power plant planetary gear system as claimed in claim 1, wherein a surface of the at least one plain bearing bush bearing against the gearwheel has a roughened surface.

13. A wind power plant comprising the wind power plant planetary gear system, wherein the wind power plant planetary gear system is designed according to claim 1.

14. The wind power plant planetary gear system as claimed in claim 1, wherein the gearwheel is made in one piece.

* * * * *